US009056592B1

(12) United States Patent
Kline

(10) Patent No.: US 9,056,592 B1
(45) Date of Patent: Jun. 16, 2015

(54) AUTOMOBILE AIRBAG DEPLOYMENT DEPENDENT ON PASSENGER SIZE

(71) Applicant: INTERNATIONAL BUSINESS MACHINES CORPORATION, Armonk, NY (US)

(72) Inventor: Eric Vance Kline, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/169,476

(22) Filed: Jan. 31, 2014

(51) Int. Cl.
*B60R 21/231* (2011.01)
*B60R 21/2334* (2011.01)
*B60R 21/015* (2006.01)
*B60R 21/01* (2006.01)
*B60R 21/16* (2006.01)

(52) U.S. Cl.
CPC ....... *B60R 21/2334* (2013.01); *B60R 21/01512* (2013.01); *B60R 2021/01231* (2013.01); *B60R 2021/23107* (2013.01); *B60R 2021/162* (2013.01)

(58) Field of Classification Search
CPC ..................... B60R 21/2334; B60R 2021/162; B60R 2021/23107
USPC ........................................................ 280/729
See application file for complete search history.

(56) References Cited

U.S. PATENT DOCUMENTS

| 5,385,368 | A | 1/1995 | Bridge | |
|---|---|---|---|---|
| 5,511,820 | A | 4/1996 | Hatfield | |
| 6,209,908 | B1 * | 4/2001 | Zumpano | 280/729 |
| 6,746,041 | B2 | 6/2004 | Chang et al. | |
| 7,717,459 | B2 | 5/2010 | Bostrom et al. | |
| 7,980,590 | B2 | 7/2011 | Foubert et al. | |
| 8,033,568 | B2 | 10/2011 | Tanaka et al. | |
| 8,702,123 | B2 * | 4/2014 | Mazanek et al. | 280/730.2 |
| 2003/0218319 | A1 * | 11/2003 | Amamori | 280/729 |
| 2005/0156411 | A1 * | 7/2005 | Steffens et al. | 280/729 |
| 2005/0275199 | A1 * | 12/2005 | Helmstetter | 280/730.1 |
| 2006/0006631 | A1 * | 1/2006 | Meissner et al. | 280/729 |
| 2006/0119082 | A1 | 6/2006 | Peng et al. | |
| 2006/0192367 | A1 * | 8/2006 | Zumpano | 280/730.1 |

OTHER PUBLICATIONS

Computer translation, Jun. 16, 1998, "Occupant Protective Device for Vehicle", JP 10157570A.
Computer translation, Sep. 12, 2012, "The airbag device", JP5024257B2.
CN2026862581J computer translation, Jan. 23, 2013, "Multifunctional protective airbag mounted in headrest of vehicle".

* cited by examiner

*Primary Examiner* — Ruth Ilan
(74) *Attorney, Agent, or Firm* — J. B. Kraft; Steven L. Bennet

(57) ABSTRACT

An opposing airbag contacts the primary inflating airbag to counter or modulate the thrust or force of the primary airbag, wherein the force of the primary airbag may be reduced dependent upon the size of the seated person of unusual size.

20 Claims, 4 Drawing Sheets

BABY SEAT

AUTOMOBILE AIRBAG DEPLOYMENT DEPENDENT ON PASSENGER SIZE

TECHNICAL FIELD

The present invention relates to the deployment of automobile airbags, and particularly to controlled deployment of multiple airbags so as to protect unusually sized, e.g. very young, small or tall or disabled, passengers from being injured by the inflating airbags in the case of an automobile collision.

BACKGROUND OF RELATED ART

A typical airbag system protects an automobile passenger in the case of a collision. The system airbag consists of a flexible fabric envelope, normally stored in a deflated condition that inflates quickly responsive to a collision to cushion passengers during a collision. An automobile may have many airbags disposed in the inner cabin of the automobile, which airbags, in combination, may inflate dependent upon the severity and location of the collision. Airbags have clearly significantly reduced death and injury rates resulting from automobile collisions.

Unfortunately, passengers of non-standard size, e.g. very tall, very small, children and disabled people, have been largely excluded from many of the benefits of airbags because of their unusual sizes. This is particularly a shortcoming with children who are substantially excluded from the safety benefits of airbags until they reach the age of 8 to 9 years old.

SUMMARY OF THE PRESENT INVENTION

The present invention uses a secondary airbag, referred to as an "opposing airbag," to contact the primary inflating airbag and, thus, counter or modulate the thrust or force of the primary airbag, wherein the force of the primary airbag may be reduced dependent upon the size of the seated person.

In accordance with the present invention, sensor apparatus for sensing the size of a person in an automobile seat is provided to an automobile having a stored deflated primary airbag facing the person. There is standard sensing apparatus for sensing a collision of said automobile and inflation apparatus responsive to said collision sensing apparatus for instantaneously inflating the primary airbag in a direction thrusting toward the person.

This invention further provides a stored deflated opposing airbag facing the stored primary airbag. There is also provided inflation apparatus, also responsive to the collision sensing apparatus, for instantaneously inflating the opposing airbag in a direction thrusting toward said primary airbag so that the opposing airbag engages and repels said expanding primary airbag with an opposing thrust of a level dependent upon the sensed size of the person. There is further provided a timing apparatus for varying the timing of the inflation apparatus of the opposing airbag with respect to the primary airbag wherein the opposing thrust level may be varied. Also, the thrust level of the opposing airbag may be further varied dependent upon the intensity of the sensed collision.

In accordance with a further aspect of this invention, there are a plurality of opposing airbags disposed around the person in the automobile seat, and there is further provided apparatus for inflating a subset of this plurality of opposing airbags dependent upon the sensed size of the seated person. This plurality of opposing airbags may further include a pair of the opposing airbags wherein each of the pair respectively retains a side of the person's head when inflated.

Another aspect of the invention addresses rear facing child seats. The system is adapted to operate when there is a child seated in a rear facing child seat wherein the primary airbag is in the child seat facing the child. In such a case, the primary airbag thrusts forward toward the child upon inflation; however, there is further provided an opposing airbag behind the seated child. This opposing airbag may also be mounted behind the child in the child seat.

In accordance with still another aspect of the invention, the opposing airbag may be portable in the deflated state and adapted to be detachably mounted in the automobile so as to co-act with said primary airbag.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
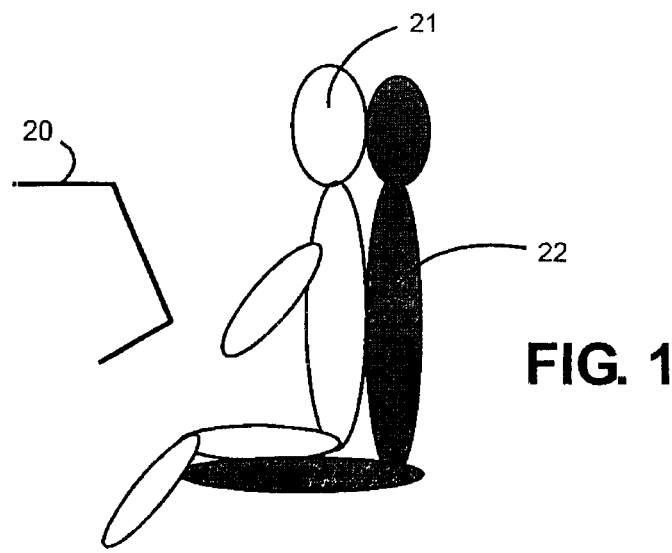
FIG. 1 is a simplified diagrammatic view of a seated passenger in an automobile with the normal deflated airbag in the dashboard.
Figure 2:
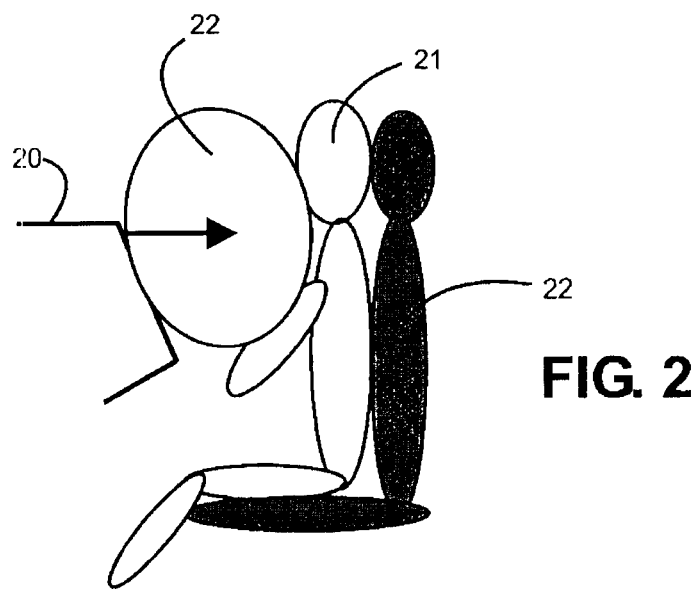
FIG. 2 is the simplified diagrammatic view of FIG. 1 after the primary airbag has been inflated and deployed upon a collision.

With reference to FIG. 1, there is shown a simplified diagrammatic view of a seated passenger in an automobile seat 22 with the normal deflated airbag in the dashboard, and with reference to FIG. 2, there is a diagrammatic view of FIG. 1 after the primary airbag has been inflated and deployed upon a collision of the automobile in which passenger 21 is seated. The airbag is dormant in a deflated stored condition within dashboard 20 or steering wheel. The airbag 23 rapidly inflates upon a collision being sensed and envelopes passenger 21 as shown in FIG. 2. The airbag, made from a flexible fabric, envelopes the passenger during the collision and restrains passenger 21 from striking or being struck by the side or top of the automobile. Most conventional airbags are rapidly expanded, after triggering, by well-known chemical reaction mechanisms. Expansion of airbags through compressed air cylinders is also used in automobiles. The technology for the rapid inflation of the airbags includes an airbag control unit that monitors several condition sensors in the automobile, e.g.

pressure, impact, wheel speed and brake sensors. When a predetermined triggering threshold is reached, a gas generating chemical reaction is triggered that causes the rapid expansion of the airbag. The technology and control of the triggering of airbags in the various combinations of the present invention will be described in greater detail hereinafter with respect to FIG. 7. It will be understood that the technology for triggering, sensing conditions may be known in the art; however, the advance of the present invention is not in the airbag technologies but in the combinations of airbags and the extent of timing and triggering of such combinations as will be described with respect to the embodiments illustrated in FIGS. 3 through 6.

Figure 3:
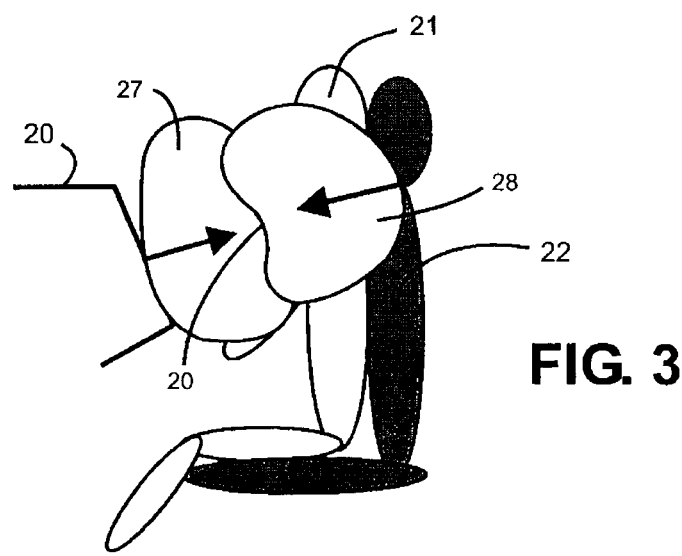
FIG. 3 is the simplified diagrammatic view of FIG. 1 after the primary and opposing airbags have been inflated and deployed upon a collision in accordance with the present invention.
Figure 4:
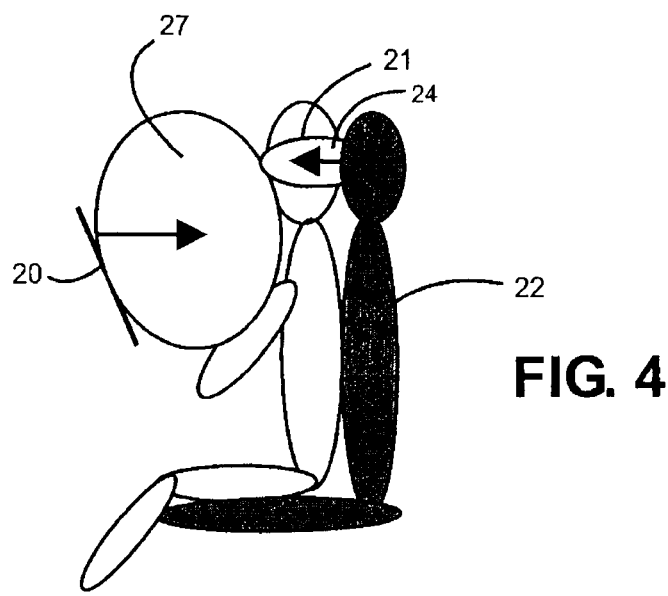
FIG. 4 is the simplified diagrammatic view of FIG. 1 after the primary and opposing airbags have been inflated and deployed upon a collision in accordance with another aspect of the present invention.

In accordance with the present invention as embodied in the illustration of FIG. 3, the size of the passenger 21 in seat 22 is sensed by any combination of weight or height or even girth sensors, a determination is made as the extent of the repelling thrust or force needed to repel the airbag 27 that is rapidly inflating as a result of a sensed collision. Based on this determination, repelling, i.e. opposing, airbag 28 is inflated also in response to the sensed collision to engage and repel primary airbag 27 wherein the passenger 21 is protected from the effects of primary airbag 27. As will be subsequently described with respect to FIG. 7, the combination of thrusts of the primary and secondary airbags will briefly contact at an equilibrium interface 20 just as the bags commence their customary slow deflation through their respective vent systems. The optimum equilibrium interface 20 position may be controlled by the timing of the triggering of the two respective airbags or by varying the force of the opposing airbags. This control may be carried out by any conventional onboard Airbag Control Unit (ACU) programmed in accordance with the present invention. With reference to FIG. 4, there is illustrated a variation of the invention wherein the opposing airbag 29 is stored in the quiescent state in the headrest of the passenger seat 22, and is released in the opposing direction shown on a sensed collision in accordance with procedure described with respect to FIG. 3.

Figure 5:
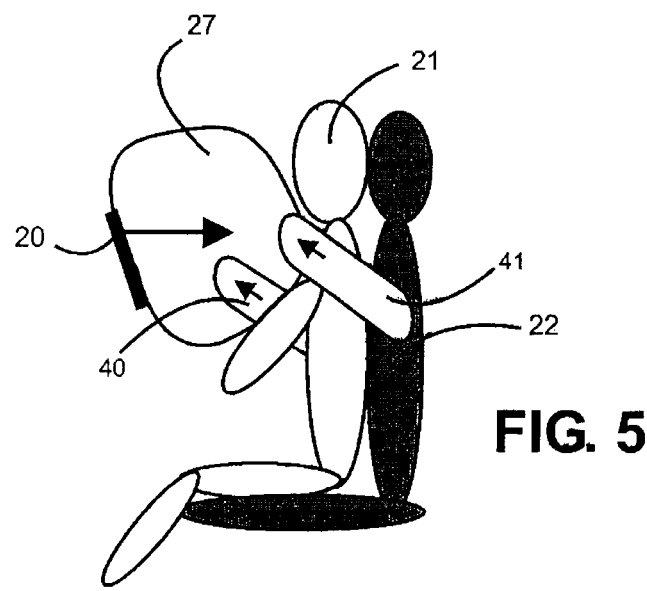
FIG. 5 is the simplified diagrammatic view of FIG. 1 after the primary and opposing airbags have been inflated and deployed upon a collision in accordance with still another aspect of the present invention.

In accordance with another aspect of the invention, shown in FIG. 5, there are several airbags stored in the automobile cabin around the passenger 21. The sensed passenger size determines which of the multiple airbags 40 and 41 will inflate. Once the requisite "threshold" for airbag has been reached or exceeded, the airbag control unit will trigger the ignition of a gas generator propellant to rapidly inflate a fabric bag. As the vehicle occupant collides with and squeezes the bag, the gas escapes in a controlled manner through small vent holes. The airbag's volume and the size of the vents in the bag are tailored to each vehicle type, to spread out the deceleration of (and thus force experienced by) the occupant over time and over the occupant's body, compared to a seat belt alone.

Figure 6:
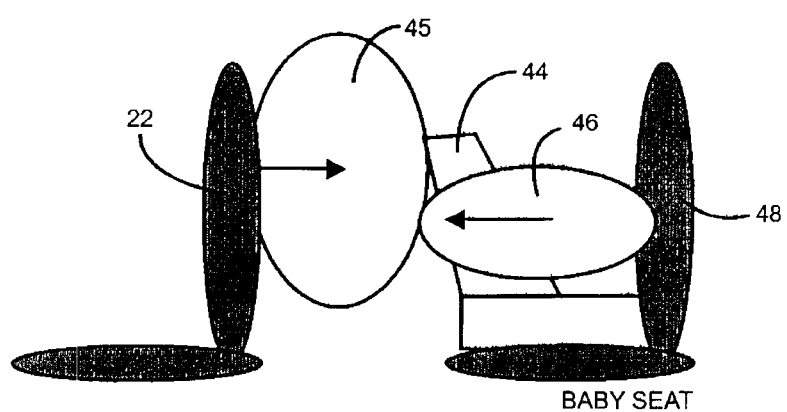
FIG. 6 is the simplified diagrammatic view of a rear facing baby seat after the primary and opposing airbags have been inflated and deployed upon a collision in accordance with the present invention.

The present invention is adaptable to a rear facing child seat 44 mounted in back seat 48 of the automobile as shown in FIG. 6. The principles described with respect to FIG. 3 are applicable wherein the primary airbag 45 may be incorporated in the back of seat 22, and the opposing airbag 46 mounted in back seat 48. At least one of the airbags, particularly the primary airbag, may be incorporated into the child seat. In such a case, apparatus would be provided for connecting sensing and triggering of the seat airbag into the ACU onboard the automobile.

In the descriptions herein, when a passenger is referred to, this should be understood to include the driver of the automobile.

Figure 7:
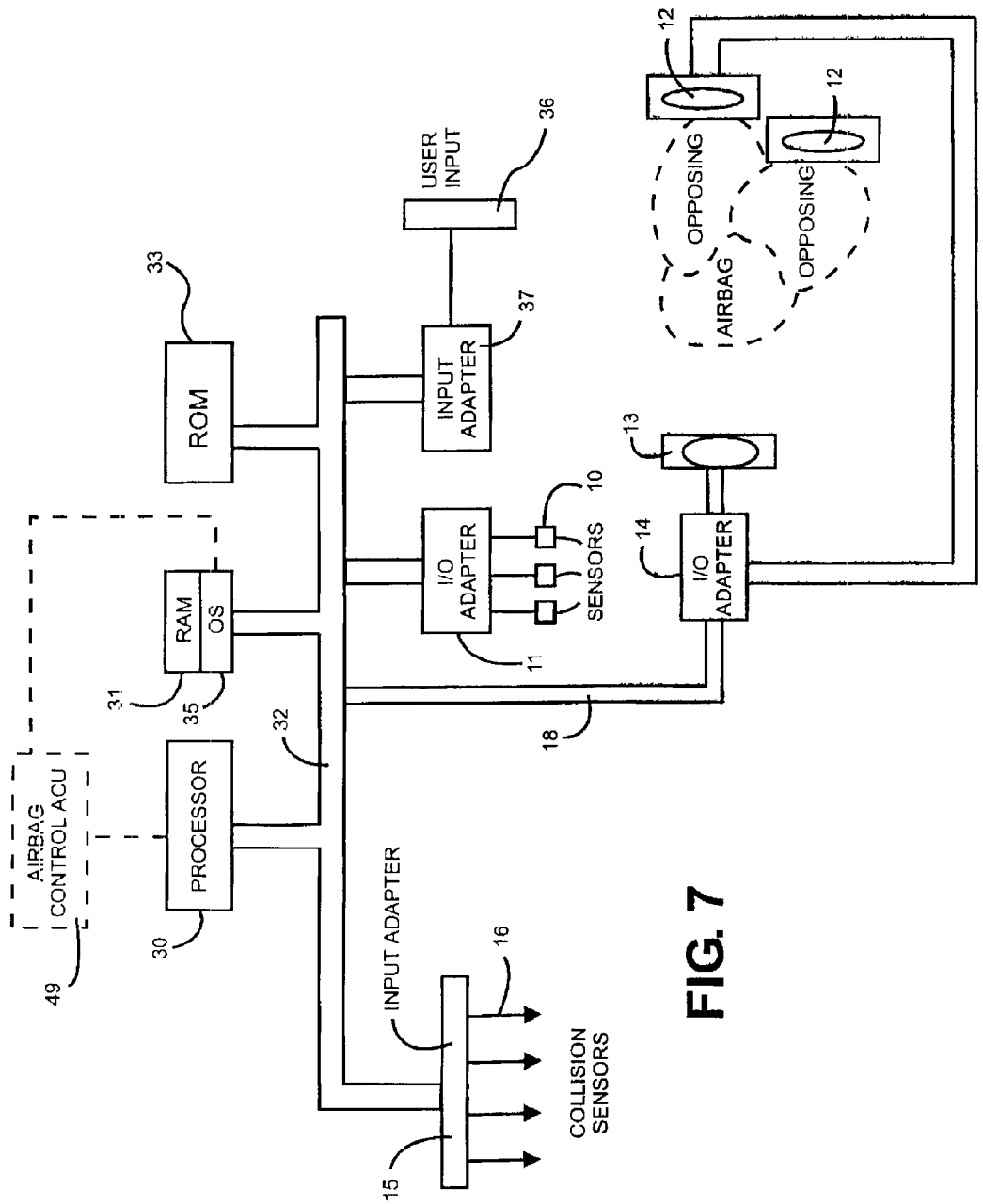
FIG. 7 is a simplified illustrative diagrammatic view of an onboard computer system that may be used to implement the present invention.

Now with reference to FIG. 7, there is illustrated the diagrammatic view of an onboard computer system that may be used to implement the present invention. The implementation of the invention makes use of a conventional onboard computer system. The passenger size sensors 10 are positioned as to determine the passenger size parameter required to control and trigger the various airbag inflations and interactions of the invention. The sensors 10 are connected via I/O adapter 11 to a central processing unit 30 via and adapter that, in turn, is interconnected to various other components by system bus 32. An operating system (OS) 35 that runs on processor 30 provides control and is used to coordinate the functions of the various components of the control system. The OS 35 is stored in Random Access Memory (RAM) 31. The Airbag Control Unit 49 for controlling the various airbag functions being described, including the sensing and controlling the deployment of the airbags, is permanently stored in Read Only Memory (ROM) 33, and moved into and out of RAM to perform its functions.

Collision sensors 16 are connected to the system via input adapter 15. Dormant primary air bag 13 and opposing airbags 12 are connected to the system via input/output (I/O) adapter 14.

The signals from the various sensors 10 and 16 are fed into the Airbag control Unit 49 that makes determinations from the angle of impact, the severity or force of the crash, as well as the passenger size variables as described above with respect FIGS. 3 through 6. Depending upon the result of these calculations, the ACU will cause a combination of primary 12 and opposing airbags 13 to deploy in accordance with the principles described with respect to FIGS. 3 through 6. Each airbag is typically activated with one or more pyrotechnic devices commonly called initiators that consist of an electrical conductor wrapped in a combustible material that activates with a current pulse between one (1) to three (3) amperes in less than two (2) milliseconds. When the conductor becomes hot enough, it ignites the combustible material that initiates the gas generator. The initiator is used to ignite a solid propellant inside the airbag inflator. The burning propellant generates inert gas that rapidly inflates the airbag in approximately 20 to 30 milliseconds. An airbag must inflate quickly in order to be fully inflated by the time the forward-traveling occupant reaches its outer surface. Typically, the decision to deploy the combination of primary and opposing airbags must inflate quickly in order to be fully inflated by the time the forward-traveling occupant reaches its outer surface. Likewise, the primary and opposing airbags must be in contact with each other.

United States regulations require deployment in crashes at least equivalent in deceleration to a 23 km/h (14 mph) barrier collision, or similarly, striking a parked car of similar size across the full front of each vehicle at about twice the speed.

Although certain preferred embodiments have been shown and described, it will be understood that many changes and modifications may be made therein without departing from the scope and intent of the appended claims.

What is claimed is:

1. A system for controlling the deployment of airbags upon collision in automobiles comprising:

sensor apparatus for sensing the size of a person in an automobile seat;

a stored deflated primary airbag facing said person;

sensing apparatus for sensing a collision of said automobile;

inflation apparatus, responsive to said collision sensing apparatus, for instantaneously inflating said primary airbag in a direction thrusting toward said person;

a stored deflated opposing airbag facing said stored primary airbag;

inflation apparatus, responsive to said collision sensing apparatus, for instantaneously inflating said opposing airbag in a direction thrusting toward said primary airbag, wherein:
said opposing airbag engages and repels said expanding primary airbag with an opposing thrust of a level dependent upon the sensed size of the person.

2. The system of claim 1, further including timing apparatus for varying the timing of the inflation apparatus of the opposing airbag with respect to the primary airbag wherein said opposing thrust level is varied.

3. The system of claim 1, wherein said thrust level of said opposing airbag is further varied dependent upon the intensity of the sensed collision.

4. The system of claim 1, further including a plurality of said opposing airbags disposed around said person in said automobile seat.

5. The system of claim 4, further including apparatus for inflating a subset of said plurality of opposing airbags dependent upon the sensed size of said person.

6. The system of claim 4 wherein said plurality of opposing airbags include a pair of said opposing airbags, each of said pair respectively retaining a side of the person's head when inflated.

7. The system of claim 1, adapted to operate when the person is a child seated in a rear facing child seat wherein the primary airbag is in the child seat and faces, the child.

8. The system of claim 7,
wherein said primary airbag thrusts forward toward the child upon inflation; and
further including an opposing airbag behind the seated child.

9. The system of claim 8, wherein said opposing airbag is mounted in said child seat.

10. The system of claim 1, wherein said opposing airbag is portable in the deflated state and adapted to be detachably mounted in said automobile so as to co-act with said primary airbag.

11. A method for controlling the deployment of airbags upon collision in automobiles comprising:
sensing the size of a person in an automobile seat;
storing a deflated primary airbag facing said person;
sensing a collision of said automobile;
responsive to sensing said collision, instantaneously inflating said primary airbag in a direction thrusting toward said person;
storing a deflated opposing airbag facing said stored primary airbag;
responsive to sensing said collision, instantaneously inflating said opposing airbag in a direction thrusting toward said primary airbag, wherein:
said opposing airbag engages and repels said expanding primary airbag with an opposing thrust of a level dependent upon the sensed size of the person.

12. The method of claim 11, further including varying the timing of the inflation of the opposing airbag with respect to the primary airbag wherein said opposing thrust level is varied.

13. The method of claim 11, wherein said thrust level of said opposing airbag is further varied dependent upon the intensity of the sensed collision.

14. The method of claim 11, further including disposing a plurality of said opposing airbags around said person in said automobile seat.

15. The method of claim 14, further including inflating a subset of said plurality of opposing airbags dependent upon the sensed size of said person.

16. The method of claim 14, wherein said plurality of opposing airbags include a pair of said opposing airbags, each of said pair respectively retaining a side of the person's head when inflated.

17. The method of claim 11 adapted to operate when the person is a child seated in a rear facing child seat wherein the primary airbag is in the child scat facing the child.

18. The method of claim 17, wherein said primary airbag thrusts forward toward the child upon inflation; and
an opposing airbag is behind the seated child.

19. The method of claim 18, wherein said opposing airbag is mounted in said child seat.

20. The method of claim 1, wherein said opposing airbag is portable in the deflated state and adapted to be detachably mounted in said automobile so as to co-act with said primary airbag.

\* \* \* \* \*